United States Patent [19]

Hyanova et al.

[11] 4,252,013
[45] Feb. 24, 1981

[54] ARRANGEMENT FOR COMPLEX DIAGNOSIS OF INTERNAL COMBUSTION ENGINES

[75] Inventors: Blanka Hyanova; Radko Sablik, both of Prague; Jan Janecek, Litvinov, all of Czechoslovakia

[73] Assignee: CKD Praha, oborovy podnik, Prague, Czechoslovakia

[21] Appl. No.: 65,968

[22] Filed: Aug. 13, 1979

Related U.S. Application Data

[63] Continuation-in-part of Ser. No. 941,930, Sep. 13, 1978, abandoned.

[30] Foreign Application Priority Data

Sep. 16, 1977 [CS]   Czechoslovakia ................. 6045-77

[51] Int. Cl.³ ........................................... G01M 15/00
[52] U.S. Cl. ................................................. 73/117.3
[58] Field of Search ................... 73/116, 117.2, 117.3, 73/119 A; 364/431

[56] References Cited

U.S. PATENT DOCUMENTS

| | | |
|---|---|---|
| 3,630,076 | 12/1971 | Staudt .................................. 73/117.3 |
| 3,906,207 | 9/1975 | Rivere et al. .................... 73/117.3 X |
| 4,052,663 | 10/1977 | Lindsey ........................ 73/119 A X |
| 4,128,005 | 12/1978 | Arnston et al. ..................... 73/117.3 |

Primary Examiner—Jerry W. Myracle
Attorney, Agent, or Firm—Burgess, Ryan and Wayne

[57] ABSTRACT

An arrangement for complex diagnosis of internal combustion engines in the course of their operation comprising a control unit, a measuring unit, an operating unit, an evaluation unit and an indication unit, and a transducer for determining parameters such as pressures, vibrations, emitted supersonic signals and temperatures at different positions of the crankshaft and under various engine operating conditions.

14 Claims, 7 Drawing Figures

ARRANGEMENT FOR COMPLEX DIAGNOSIS OF INTERNAL COMBUSTION ENGINES

RELATED APPLICATION

This application is a continuation-in-part of copending application Ser. No. 941,930, now abandoned filed Sept. 13, 1978 and assigned to the assignee of the instant application.

BACKGROUND OF THE INVENTION

The present invention relates to an arrangement for complex diagnosis of internal combustion engines in the course of their operation.

The technical condition of internal combustion engines is at present judged according to conditions of the injection device, of the quality and course of the combustion process, of the level of vibrations and of ultrasonic signals emitted by the main nodal points of the engine. These diagnostic values are now monitored in the course of performance of diagnostic tests on screens of oscilloscopes by means of individual, large and frequently expensive apparatus. The coordination of operation of these frequently rather different units is difficult. The decision about the technical condition of the tested engine has to be made by evaluation of the course or trend of the diagnostic values, as monitored subsquently on the sreeen of the oscilloscope, which technique is not fully reliable, tedious, and demanding on the quality and experience of the technician making the diagnosis, whereby the desired results can be recorded only with difficulty.

There are also complicated automatic diagnostic computer controlled systems with high requirements on the size of memory devices due to the large number of diagnostic values which have to be scanned and due to the necessity of the use of high sampling speeds of the scanned diagnostic dynamic values (50 KHz. and more). Such systems are expensive, they require extensive preparation of individual programs according to the types of engines to be tested, and they can be used only by companies which operate a large number of engines of the same type within a limited space.

SUMMARY OF THE INVENTION

It is an object of this invention to provide an arrangement for complex diagnosis of internal combustion engines which is efficient, does not require highly trained attendants and may be of reasonable cost. The arrangement according to this invention comprises a control unit, a measuring unit, an operation unit, an evaluation unit and an indication unit. The input of the control unit is connected to a pick-up device for sensing the position of the crankshaft of the engine, and the inputs of the measuring unit are connected to pick-up devices for sensing pressures, vibrations, emitted ultrasonic signals and temperatures. The inputs of the operating unit are connected to outputs of the control unit and the outputs of the measuring unit and the outputs of the operating unit are connected to inputs of the measuring unit, as well as to inputs of the evaluation unit and the inputs of the indication unit. The arrangement according to this invention enables a quick determination of the fundamental adjustment (of the parameter values), of defects of internal combustion engines and of the main points in the course of their operation without interruption of their functioning.

The apparatus of the invention is designed for picking up, at an instant, diagnostic signals important for ascertaining technical engine conditions, and for processing them in accordance with predetermined algorithms, the signals being transformed so as to directly give the diagnostic indices or values. According to such algorithms, the apparatus also enables rapidly varying (i.e. dynamic) signals to be pre-processed in such a way that they are indicated or evaluated in the form of quasi-static indices. In the apparatus, the diagnostic indices are shown in a combination that is characteristic for specific engines types and which makes it possible to detect combined or mutually dependent failures or malfunctions. The apparatus allows these indices to be obtained without the necessity for coupling the engine to any loading device.

The arrangement also allows permanent storage of diagnostic dates, for instance in order to determine a prognosis for development of diagnostic values. The arrangement provides as its output a suitable combination of analog apparatus and of digital indices. It can be used as a peripheral unit for preprocessing of diagnostic values in connection with automatic diagnostic systems of a higher level, controlled by a computer. The arrangement according to the invention is of small size and low weight and sufficiently portable so that it can be used for performance of diagnostic tests at different places.

DESCRIPTION OF THE PREFERRED EMBODIMENT

Figure 1A:
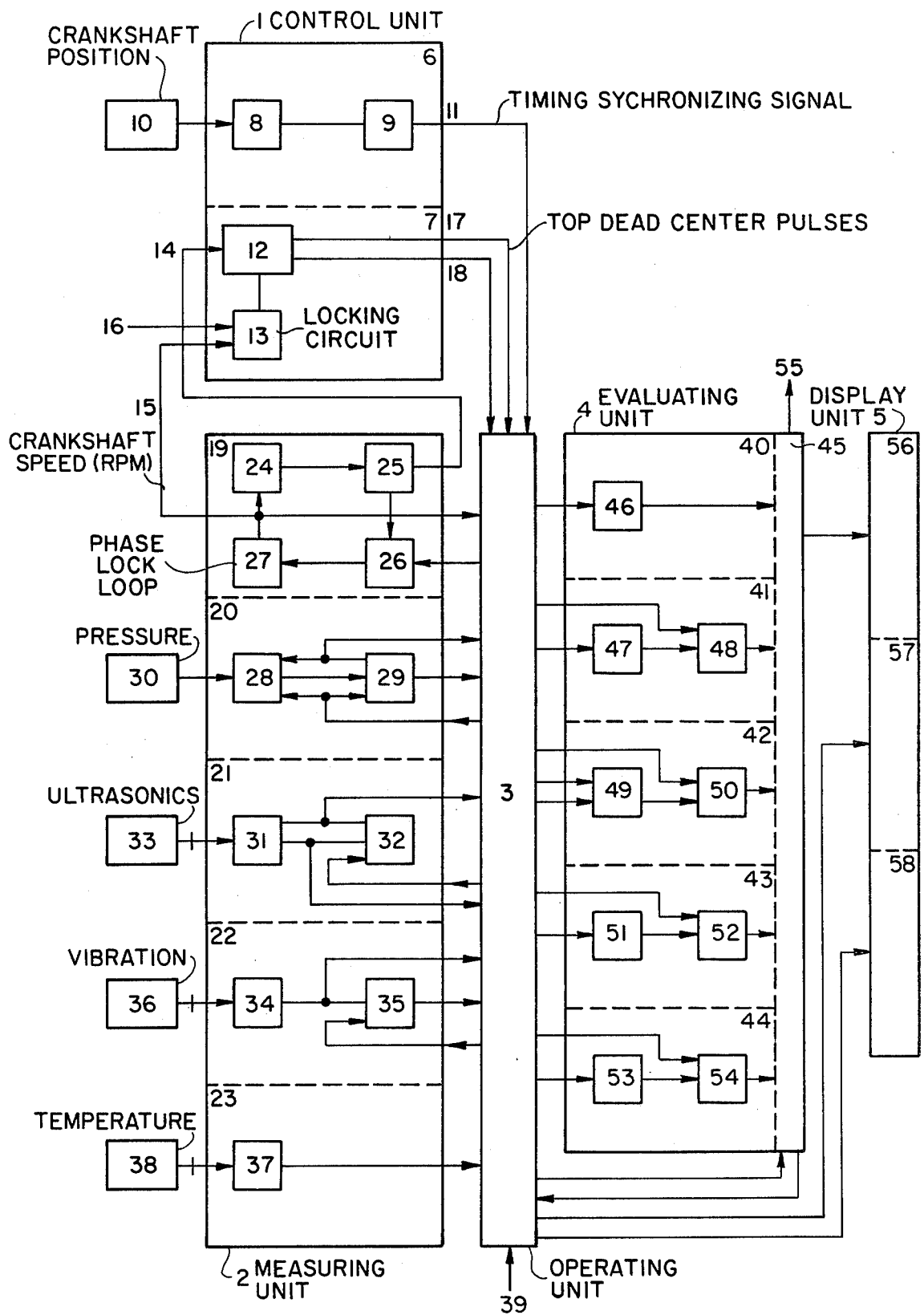
FIG. 1a shows an interconnection diagram of the various units of a system according to a preferred embodiment of the invention.

The main advantage of the apparatus according to the present invention are as follows:

(a) The apparatus is designed for picking up and processing diagnostic signals important for ascertaining a technical engine condition, in a particular time interval and in accordance with predetermined algorithms, the signals being transformed so as to directly give the diagnostic indices which otherwise use obtainable only by means of an elaborate procedure or by use of a large computer facility.

(b) The apparatus is able to rapidly preprocess variable (dynamic) signals in accordance with predetermined algorithms in such a manner that it indicates them in the of quasistatic indices. These indices can then be easily utilized to evaluate the engine condition, or fed to a computer controlling the entire diagnostic system, without imposing enormous demands upon the computer memory.

(c) The apparatus provides diagnostic indices in such a manner that even intricate failures or malfunctions of the tested engine can be detected.

(d) The arrangement of the blocking and memory circuitry in the apparatus according to the invention makes it possible to ascertain the diagnostic parameters of an engine without the necessity for coupling the engine to any loading means; however, a method obtaining parameters of the engine to be tested during self-loading on start thereof, could be employed if so desired.

(e) The apparatus according to the invention is designed for making the repair shop work as easy as possible. The apparatus enables engines diagnosis without using any computer, thus enabling its use by a relatively unskilled operator. The attendance has been simplified to such an extent than an ordinary serviceman is able to read off the fundamental diagnostic quantities and to evaluate the technical engine condition not only without a computer but even without an oscilloscope as an evaluation aid.

(f) The apparatus is able to preprocess dynamic signals to quasistatic quantities in dependenc upon preselected and long-term experimentally proven relationships.

Thus, for instance, one of the important diagnostic indices comprises the amount of fuel to be injected into individual cylinders. This index can be derived from the equation $$q = \mu f \sqrt{2g \frac{P - Pv}{\gamma \eta}}$$

in which
$\mu$ = throughflow coefficient of the nozzle
f = throughflow cross-section of the nozzle
P = fuel pressure upstream of the nozzle, as measured by the pressure in the delivery pipe line of the injection pump
Pv = counterpressure in the cylinder
$\gamma \eta$ = specific weight of fuel In relatively evaluating the fuel amounts injected into individual cylinders the equation can be formed—with regard to the approximately indentical ambient conditions—into the form $$q = k \sqrt{P}$$

The fuel amount injected into the cylinder in a single injection will be then $$Q_1 = k \int_{t_t}^{t_k} \sqrt{p} \, dt$$

where
$t_t$ = beginning of the injection period
$t_k$ = end of the injection period.

It results from the foregoing that after the square root of the pressure time behavior has been found, the integral of the curve within a time interval between the beginning and the end of the fuel injection period comprises an index of the fuel amount injected into the cylinder. For practical use of the above relation it is necessary to process the signal corresponding to the injection pressure-time characteristic so as to obtain the quasistatic diagnostic index corresponding to the amount of fuel injected into each of the individual cylinders.

With the hitherto used diagnostic systems, such a dynamic pressure-time signal has to be sampled and digitized at a rate of at least 50 kHz, and the individual sampled values must be processed in a computer with a relatively high number of storage elements.

In the apparatus of the invention, all the necessary processes, such as finding a root, integration, filtering, multiplication, or the like, are preferably effected in an analog fashion. The result of such preprocessing is a quasi-static value corresponding to the amount of fuel injected into each cylinder, which value is utilized by the diagnostic system as relative (but for diagnostic purposes quite sufficent) data.

The arrangement as indicated in the drawing comprises a control unit 1, a measuring unit 2, an operating unit 3, an evaluation unit 4 and a display or indicating unit 5.

The control unit comprises a synchronization block 6 and a control block 7. The synchronization block 6 comprises a shaping circuit 8 and a pulse generator 9. The input of the synchronization block 6 is connected with the position pick-up device 10 of the engine crankshaft. The output of the synchronization block 6 is connected with the operating unit 3 by a conductor 11 of synchronization pulses. The control block 7 comprises a generator 12 of control pulses corresponding to top dead centers of pistons of individual engine cylinders and a locking circuit 13. A conductor 14 of signals of the instantaneous value of the displacement of the engine crankshaft is connected to the input of the control block 7, furthermore a conductor 15 of the signal of the instantaneous angular speed of the engine crankshaft and a conductor 16 of a signal for external control of the locking circuit 13. The output of the control block 7 is connected to the operating unit 3 by a conductor 17 for the upper dead center signal of the piston in the cylinder and by a conductor 18 of the control pulse.

The measuring unit 2 comprises a block 19 for determination of the instantaneous angular speed of the engine crankshaft, a block 20 for processing pressure signals, a block 21 for processing emitted ultrasonic signals, a block 22 for processing vibration signals and a block 23 for processing temperature signals. The block 19 for determination of the instantaneous angular speed of the engine crankshaft comprises a voltage controlled oscillator 24, a counter 25, a phase detector 26 and a feedback circuit 27, which are interconnected as a loop for phase synchronizing. The block 19 is by its input and output connected to the operating unit 3. Its further outputs are connected to the control block 7. The block 20 for processing pressure signals comprises an amplifying circuit 28 with a shaping circuit and a pulse generator 29. The input of block 20 is connected with a pick-up device 30 of pressures on the engine and with the operating unit 3. The outputs of block 20 are connected to the operating unit 3. The block 21 for processing emitted ultrasonic signals comprises an amplifying circuit 31 with shaping circuits and a pulse generator 32. The inputs of block 21 are connected to pick-up devices of emitted ultrasonic signals 33 and to the operating unit 3. The block 22 for processing vibration signals comprises an amplifier circuit 34 with a shaping circuit and a pulse generator 35. The input of block 22 is connected to a pick-up device 36 of signals of the course of vibrations and to the operating unit 3. The outputs of block 22 are connected to the operating unit 3. The block 23 for processing signals of temperature pick-up devices, comprising an amplifier 37 is connected at its input with pick-up devices 38 of signals of temperature conditions of individual nodal points of the engine and its output is connected to the operating unit 3.

The operating unit 3 is the central unit of the whole diagnostic arrangement. Its input are connected with all parts of the arrangement i.e. with the control unit 1, with the measuring unit 2, with the evaluation unit 4 and with the display or indicating unit 5 and in addition at its input with a conductor 39 of a signal of external control of the operating unit 3. The operating unit 3 comprises a switch-over board, for interconnection of its inputs and outputs.

The evaluating unit 4 comprises a block 40 for storage of instantaneous magnitudes of measured values, a block 41 for performance of the derivation of the course of supplied values and their storage, a block 42 for determination of distances of characteristic pulses, indicated in angular displacements of the engine crankshaft, a block 43 for performance of integration of supplied values and their storage, a block 44 for determination and storage of maximum magnitudes of supplied values and a block 45 of an arithmetic unit. The block 40 for storage of instantaneous magnitudes of measured values comprises memory circuits 46 and is with its input connected with the operating unit 3 and with its outputs with the block 45 of the arithmetic unit. The block 41 for performance of the derivation of the course of supplied values and for their storage comprises a derivation circuit 47 and a memory circuit 48. The block 42 for determination of time intervals between characteristic pulses expressed in angular displacements of the engine crankshaft comprises an integration circuit 49 and a memory circuit 50. The block 43 for performance of integration of supplied values comprises an integration circuit 51 and a memory circuit 52. The block 44 for determination and storage of maximum magnitudes of supplied values comprises a circuit 53 for determination of the maximum magnitude and a memory circuit 54. The blocks 40, 41, 42, 43 and 44 are with their inputs connected to the operating circuit 3 and with their outputs of the blocks 45 of the arithmetic unit. The block of the arithmetic unit comprises circuit for performance of individual arithmetic operations. Its input is connected with blocks 40, 41, 42, 43 and 44 and with the operating unit 3. The block 45 of the arithmetic unit is with its outputs connected with the indicating unit 5 and with the operating unit 3 and is provided with an output 55 of diagnostic indices for their working in automatic systems of a higher order.

The indication unit 5 comprises a block 56 for indication of diagnostic indices and a block 57 for indication of generated pulses. The block 56 for indication of diagnostic indices comprises analog or digital indicators of diagnostic indices and is connected with its input with the block 45 of the arithmetic unit. The block 57 for indication of the course of input signals comprises a display, possibly an oscilloscope and is connected with its input with the operating unit 3. The block 58 for indication of generated pulses comprises a display, possibly an oscilloscope, and is connected with the operating unit 3.

Figure 2D:
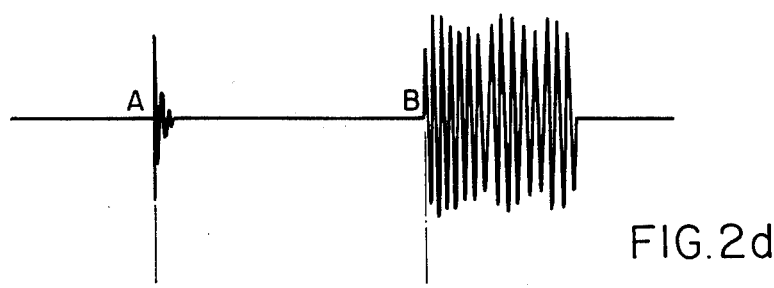
FIG. 2d shows ultrasonic pressure fluctuations occurring near the end of the fuel delivery period.
Figure 2C:
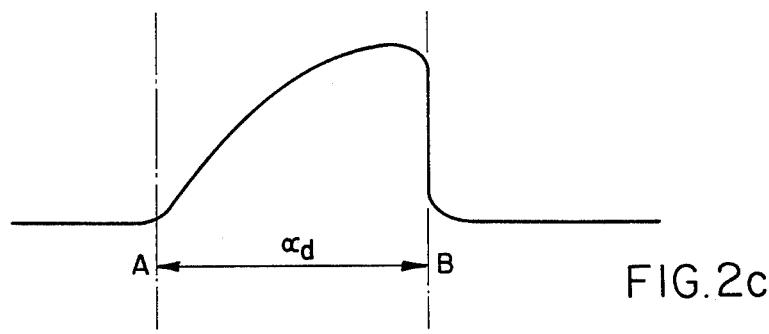
FIG. 2c shows the pressure pulse as it occurs at the discharge port of the injection pump.

A conventional injection pump of internal combustion engines comprises a piston adapted to reciprocate in a cylinder with openings, and to operate with a control edge designed for regulating the supplied fuel amount by controlling the fuel-by-pass at the beginning and at the end of the delivery interval. As it is apparent in FIG. 2a, at the beginning of the delivery interval, the piston front portion masks a by-pass port. Immediately before said port is masked, the fuel supply is throttled and at the instant the port is masked, an abrupt pressure rise occurs in the space above the piston, thus causing a mechanical shock. Such process can be indicated by an emitted ultrasonic signal as shown in FIG. 2d, or by the beginning of a pressure pulse scanned or picked up at a discharge pipeline adjacent the injection pump as can be seen in FIG. 2c.

Figures 2A, 2B:
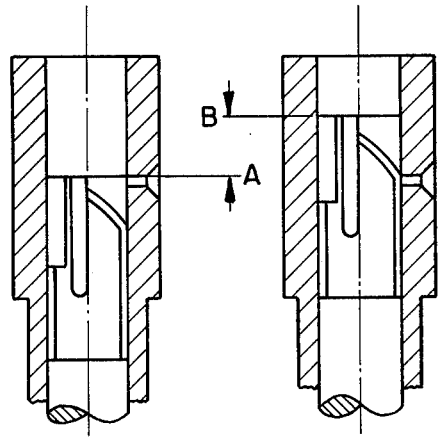
FIG. 2a shows a conventional fuel injection pump at the beginning of the fuel delivery internal.
FIG. 2b shows the fuel injection pump at the end of the fuel delivery period.

At the end of the fuel delivery period, the helical control edge of the piston demasks by the by-pass port as shown in FIG. 2b, and the fuel delivered by the piston by bypassed back into the feed duct of the pump. Simultaneously, the fuel pressure above the piston drops. Such process can be also indicated by an emitted ultrasonic signal excited by fuel throttling, and by a pressure decrease in the delivery pipeline.

The arrangement according to this invention operates as follows: For diagnostic tests of engines, the arrangement is connected to pick-up devices of characteristic diagnostic signals, which devices are permanently or temporarily situated on measuring places on the engine. Both (i) quickly changing signals (dynamic signals), determining the position of the engine crankshaft, the pressure course (in the injection line, combustion and compression pressures and others), courses of emitted ultrasonic signals and courses of vibrations, as well as (ii) quasi-statistical signals, characterizing temperature conditions of individual junction points of the engine (for instance the temperature of the surface of injection pumps and temperature of the supplied fuel), provided. In addition, external signals can be supplied to the input of the arrangement, i.e. (i) a signal for external control via conductor 16 from the locking circuit 13 and (ii) a signal for external control of the operating unit 3 via conductor 39.

These signals are utilized as follows: The signal from the pick-up device 10 of the position of the engine crankshaft (for instance a photoelectric, magnetic or other pick-up device), enters the synchronization block 6 of the control unit 1, where synchronizing pulses are generated corresponding to a selected defined position of the engine crankshaft. These pulses are supplied over conductor 11 by way of the operating unit 3 to the input of block 19 for determination of the instantaneous angular speed of the engine crankshaft. A voltage controlled oscillator 24 cooperates with the counter 25 to generate a signal which is phase compared by the phase detector 26 with the signal supplied via conductor 11, and the resulting output signal adjusts (over the feedback circuit 27) the frequency of the controlled oscillator 24, so that the phase deviation between the signal supplied over conductor 11 and the generated signal is zero. The voltage controlling the oscillator 24 is proportional to the instantaneous angular speed of the engine crankshaft and leaves the block 19 via conductor 15.

The signal over conductor 14 corresponding to the instantaneous magnitude of the angular deviation of the engine crankshaft obtained in the counter 25 is supplied to the circuit of the pulse generator 12 of block 7, where pulses are generated corresponding to top dead centers of pistons of individual engine cylinders, supplied via conductor 17 and control pulses, supplied via conductor 18. Such a control pulse can be for instance a signal which precedes a signal corresponding to the top dead centers of pistons of individual cylinders for an adjustable angle of displacement of the motor crankshaft. This pulse serves to determine the start of angular intervals where the individual blocks of the measuring unit 2 are working their input signals. That enables elimination of the influence of disturbing signals, which may occur in the course of testing of more complicated arrangements. Another control pulse is for instance a signal corresponding to the top dead center of the exhaust stroke of the piston where combustion products are forced out of the cylinder. The pulses 17 are supplied to the operating unit 3 where a pulse is selected corresponding to the top dead center of the piston at the end of the exhaust stroke of the just tested cylinder. This pulse is introduced into the evaluating unit 4.

Signals coincident with the start and the end of fuel supply are converted by means of known circuitry into pulses, with the time interval between start of fuel supply and end of fuel supply pulses being expressed in angular degrees of crankshaft rotation.

The control pulses 18 are supplied to the operating unit 3 which controls the operation of the evaluation unit 4 and to the measuring unit 2 according to the preselected kind of operation. The signal 15 for the instantaneous angular speed of the motor crankshaft is supplied to the input of the operating unit 3 and from its output to the input of the integration circuit 49 of block 42. The signal 15 serves in this circuit to provide data about the time interval between characteristic pulses, indicated in angular displacements of the crankshaft according to the equation $$\alpha = \int_{t_1}^{t_2} \omega dt.$$

The start and end of integration is controlled by means of the operating unit 3. The signal 16 of external control supplied to the input of the locking circuit 13 enables to intercept generation of control pulses 8 and primarily of those, serving for control of memory circuits of the evaluating unit 4. This operating signal 16 can be derived from the magnitude of some of the evaluated signals.

The arrangement for evaluation of the signal for external control in case the preselected angular speed is achieved, is contained directly in the locking circuit 13. The signal of the pick-up device 30 of the course of pressure on the engine is supplied to the input of circuit 28 where it is amplified to the prior stipulated amplitude. The amplified signal is in the circuit 28 further worked, thus generating further signals, so that the following signals are on the input of the circuit 28: an amplified signal of the course of pressure, a signal proportional to the first derivation of the amplified input signal. These signals are supplied to the operating unit 3, by way of which they are supplied both to inputs of the block 57 for indication of the course of input signals and to inputs of the evaluation unit 4 according to the selected measuring operation.

From the amplified input signal of the forming circuit 28 are in the circuit of the pulse generator 28 generated pulses, corresponding to moments of the start, of the first maximum and of the end of the signal of the course of pressures on the engine. These pulses are supplied to the input of the operating unit 3, by way of which they can be supplied both to the input of block 42, where their angular distance is evaluated (either the relative time gap, indicated in the angular displacement of the motor crankshaft or as time gap from a pulse, corresponding to a certain position of the motor crankshaft) and also to block 43, where it serves for the control of the integration circuit 51 and for the control of the record in the memory circuit 52.

Most of the internal combustion engines are provided with an injection valve of an enclosed needle type, the opening and shutting off of which depend upon the pressure of the fuel supplied and on the bias of injection valve spring. As a pressure pulse from the pump enters the valve, the needle, due to the fuel pressure, is lifted from its seat and the fuel begins to inject into the engine cylinder. Owing to such process and to the discharge of fuel out of the nozzle orifices, the fuel pressure below the needle drops. The moment immediately preceding this pressure drop is indicated as "first maximum".

Figure 3:
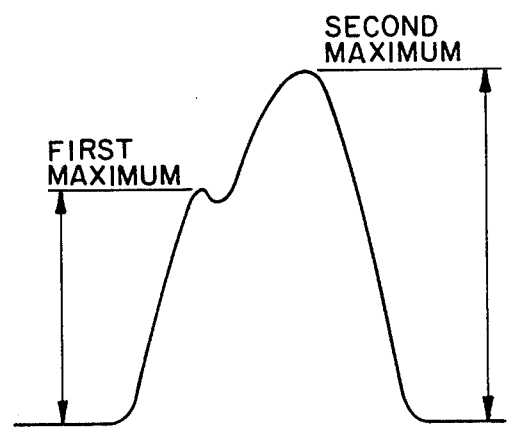
FIG. 3 illustrates a typical fuel pressure behavior curve of a fuel injector.

The second maximum corresponds to the apex of the fuel pressure behavior curve as shown in FIG. 3.

The pulse corresponding to the moment of the first maximum can be supplied as an operating pulse to block 40, which enables the determination of the value of the pressure signal at this moment. The emitted ultrasonic signal from the pick-up device 33 is supplied to the input of block 21 for working of emitted ultrasonic signals.

The emitted ultrasonic signal scanned by the pickup 33 comprises a broad spectrum of frequency components. For processing such signals into corresponding pulses there is preferably availed of the fact that the emitted signal corresponding to the fuel supply start has another frequency spectrum than the emitted signal excited by the end of fuel supply. In processing the signal corresponding to the supply end—which signal has higher frequency components—there is filtered off the signal corresponding to the supply start and having lower frequency components.

These signals are obtainable in the way apparent from FIGS. 2a–2d.

In circuit 31 the input signal is amplified and frequency components are separated therefrom, which are important for obtaining characteristic signals emitted from the tested junction points of the engine.

Since the frequency components range within the band of from 100 kHz to 1 MHz, it is necessary to further operate with an envelope of such signals.

The envelope is obtained in such a way that by means of known circuitry a detection of time behavior of such signals is effected. The envelope gives a course of signal amplitudes in time terms because it actually connects tops of individual cycles.

The circuit 31 also provides amplitude envelopes of these frequency components, which are supplied to the operating unit 3, by way of which they are connected both to the block 57 for indication of the course of input signals and to inputs of the evaluation unit 4 according to the preselected kind of operation.

In addition, the applied envelopes of frequency components are transformed in circuit 31 to logic signals, from which, in the circuit of the pulse generator 32, pulses are generated, which characterize courses of amplitude envelopes of emitted signals.

The logic signals simply process pulses that give rise to signals corresponding to the start and to the end of fuel supply effected by the injection valve. These pulses are supplied to the operating unit 3, wherefrom they can be supplied to the inputs of block 42, where they serve for determination of time gaps, similarly as for pulses, derived from the pressure signal. It is furthermore possible to utilize them for control and operation of the respective circuits of remaining blocks of the evaluation unit 4 according to the selected kind of operation.

In accordance with the diagnostic test program, the vibration pickups can be located at various points of the engine, as, for instance, adjacent the suction and the exhaust valves, respectively, for ascertaining technical conditions of valve gear according to amplitudes and time behavior of vibrations, or on the injection valve for indicating the instant of injection valve needle lift. Vibrations are picked up by an accelerometric pick-up device of known structure.

The amplitude and the time behavior of vibrations relative to a crankshaft revolution in angular degrees are indicated, for example, by the size of tolerated clearances in modules to be tested so that they constitute important diagnostic criteria with the completeness of the diagnostic process in view.

The signal of pick-up devices 36 of vibrations is supplied to the circuit 34 of the block 22 for processing of vibration signals, where it is amplified to a selected level and supplied via the operating unit 3 both to the block 57 for indication of input signals and to the respective blocks of the evaluation unit 4 according to the selected kind of operation.

The amplified input signal is also utilized in circuit 34 so that it is possible to form characteristic pulses in the circuit 35 which are supplied via the operating unit 3 to the input of block 42 for determination of time intervals indicated in terms of angular displacement of the motor crankshaft, in similar fashion as for pulses derived from pressure signals. Alternately, they can be used for the control and operation of respective circuits of the evaluation unit 4 according to the preselected kind of operation. The pulse signals generated in circuits 29, 32 and 35 can be supplied via the operating unit 3 to the inputs of the block 58 for indication of generated pulses for checking the operation of the arrangement.

The signal from the temperature pick-up device 38 is supplied to the block 23 for working signals from the temperature pick-up device. The worked signal is from here supplied via the operating unit 3 to the arithmetic unit 45, from which it is supplied either directly or after being worked to the block 56 for indication of diagnostic indices. Output signals from the circuits 28, 31, 34 from blocks 19 and 23 and pulses from circuits 12, 29, 32 and 35 can be supplied to inputs of the evaluation unit 4 via the operating unit 3. The block 40 serves for storage of voltage signals corresponding to magnitudes of measured values at the moment chosen by the operating unit 3 and corresponding to characteristic pulses from circuits 12, 29, 32 and 35. The passage of these pulses can be prevented by the locking circuit 13. The block 40 indicates therefore magnitudes obtained at the end of measurement.

The block 41 serves for determination of the instantaneous magnitude of a derivative chosen at the moment by the operating unit 3 and corresponding to one of the pulses from circuit 12, 29, 32 and 35. The input signal is differentiated in circuit 47 and the instantaneous magnitude of the derivative at the chosen moment is registered in the memory circuit 48. The memory circuit 48 can be blocked similarly as circuit 40. The block 42 serves for determination of the angular displacement of characteristic pulses selected by the operating unit 3.

A signal for the instantaneous angular speed is supplied to the input of the integration circuit 49 and is integrated within the interval between pulses at moment $t_1$ and $t_2$. The output is a signal proportional to the angular displacement $\alpha$ of the crankshaft:

$$\alpha = \int_{t_1}^{t_2} \omega dt$$

This signal is stored in the memory circuit 50 similarly as in block 40 at moment $t_2$. The block 43 serves for determination of any integral I of the course of signals s(t) and within an interval from $t_1$ to $t_2$ chosen by the operating unit 3:

$$I = \int_{t_1}^{t_2} s(t) dt$$

The output signal of the integral is stored in circuit 52 similarly as in block 40 at moment $t_2$. The block 44 serves for determination and storage of maximum magnitudes of a signal supplied from the operating unit 3. The circuit 53 determines this magnitude within the interval $t_1$ to $t_2$ determined by pulses selected by the operating unit 3. This magnitude is recorded in the memory circuit 54 at the moment the measuring interval has ended. The circuit 54 can be blocked similarly as block 40. The output signals of memory circuits 40, 48, 50, 52 and 54 are supplied to the input of the arithmetic unit 45, over which they are connected either directly or after correction and possible further working to the block 56 for indication of diagnostic indices and as output 55 of diagnostic indices for remote and automated processing of the diagnostic test in systems of a higher order.

The operating unit 3 serving for mutual interconnection of the control unit 1, of the measuring unit 2, of the evaluation unit 4 and of the indication unit 5 switches the individual signals and pulses generated by the control unit 1 and measuring unit 2 to inputs of the evaluation unit 4 according to the stipulated measuring program, controls the operation of the arithmetic unit 45 and furthermore selects signals and pulses indicated in the indication unit 5. The operation of the operating unit 3 can be preselected by manual operating elements of the arrangement or chosen by an external control signal 39 in case of remote or automatic operation of the diagnostic test.

The apparatus according to the invention particularly picks up the following signals:
signal from the crankshaft position sensor;
course of the pressure in the injection pipeline at the injection valve and at the injection pump;
course of the ultrasonic signal emitted by the injection pump;
course of vibrations on the injection valve; and
course of the ultrasonic signal emitted by the piston group, and particularly on the engine block.

These signals applied to the inlet of the apparatus are immediately processed, and particularly to give the following data:
instantaneous angular velocity of the crankshaft;
fuel supply advance expressed in angular degrees of crankshaft revolution;
fuel supply time expressed in angular degrees of crankshaft revolution;
a coefficient proportional to the throughflow injection nozzle coefficient;

data about mechanical injection pump condition, derived from the course of the ultrasonic signal emitted by the injection pump;

data about the fuel amount injected into the cylinder;

data about the maximum value of the combustion and compression pressures;

relative data about the effective and the indicated output of the individual engine cylinders; and data characterizing the mechanical condition of the piston group, derived from the ultrasonic signals emitted by the piston group.

The above data are directly indicated on analog elements of the apparatus, and combinations thereof provide algorithms for evaluating the technical conditions of the most critical points of the engine and the fundamental adjustment thereof.

Figure 1B:
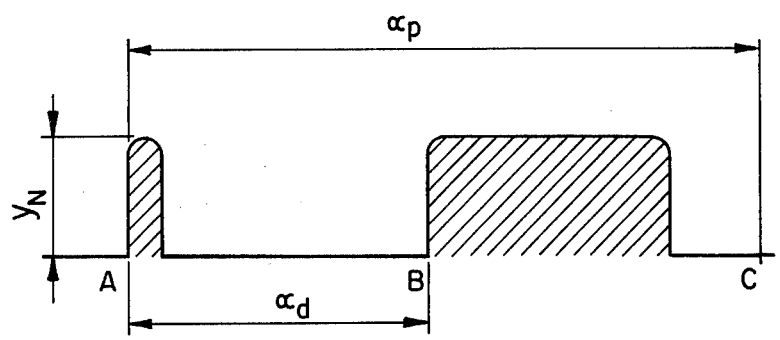
FIG. 1b shows a diagram illustrating the manner in which an injection pump performance signal is derived.

Thus, for example, the following algorithms are used for evaluating the technical condition of an injection pump by means of the claimed apparatus:

If the envelope of an ultrasonic signal (detected by a ultrasonic or pressure transducer) emitted on the delivery branch of the injection pump has the configuration shown in FIG. 1b.

where

A = beginning of fuel supply by the pump

B = beginning of by-passing (i.e. fuel supply end) by the pump

C = top dead center of the cylinder (HU)

$\alpha_p$ = fuel supply advance upstream of the top dead center (AC)

$\alpha_d$ = fuel supply interval (AB)

$\Psi_N$ = ultrasonic or pressure transducer signal amplitude $$\psi = \int_{\alpha A}^{\alpha B} y_N \, d\alpha$$

$\Delta$ = allowable tolerance of the diagnostic signal $\alpha_{pj}$, $\alpha_{dj}$, $\psi_j$—nominal values $\psi$ = injection pump performance parameter then (1) normal condition: $\alpha_p = \alpha_{pj} \pm \Delta$; $\alpha_d = \alpha_{dj} \pm \Delta$; $\psi = \psi_j + \Delta$ (2) minor fuel supply advance: $\alpha_p < \alpha_{pj} - \Delta$ (3) major fuel supply advance: $\alpha_p > \alpha_{pj} + \Delta$ (4) minor pump control rod outshift: $\alpha_d < \alpha_{dj} - \Delta$ (5) major pump control rod outshift: $\alpha_d > \alpha_{dj} + \Delta$ (6) injection pump failure (leakage, delivery valve failure, mechanical pump failure): $\psi > \psi + \Delta$ A failure of the injection pump (6) can be empirically identified more in detail as, for instance, in a combination with an algorithm making use of the maximum amplitude to the first maximum at the beginning of the curve of injection pressure behavior which is picked up at the injector.

If $\epsilon = \epsilon_j \pm \Delta$ and $\psi > \psi + \Delta$ a mechanical failure of the injection pump is concerned.

If $\epsilon < \epsilon_j - \Delta$ and $\psi > \psi_j + \Delta$ a leakage type failure is concerned.

Similar algorithms and combinations thereof can be then availed of when evaluating the technical condition of the products to be tested.

Combinations of diagnostic algorithms are specific for various types of internal combustion engines and constitute actual software of any diagnostic system with the apparatus according to the invention.

The apparatus according to the invention makes it possible to obtain the above-mentioned fundamental diagnostic indices without being necessary to connect the engine to some external loading means such as, for example, electric dynamometer, hydraulic brake, or the like.

To this purpose, there is used a self-loading method based upon loading the engine by its own inertia resistances manifesting themselves at the engine start. The principal of this method resides upon the basic equation of a rotary system motion, reading as follows:

$$\Sigma M = I \cdot \epsilon$$

where $\Sigma M$: moments involved in the system

I: moment of inertia of the system $\epsilon$: angular acceleration

If accommodating the equation to the case of a piston engine it can be written, having neglected the influence of shift forces, as follows:

$$\Sigma M = Mi - \Sigma Mp = I \cdot \epsilon = Me$$

where

Mi: internal moment of the engine $\Sigma Mp$: moment of passive resistances of the engine Me: external moment of the engine.

The external driving moment of the engine—after an allowable simplification—is proportional to the angular crankshaft acceleration, and in a transient condition, i.e. during the start, the engine is loaded only by its own inertia forces up to the instant of intervention of a regulator giving it full torque corresponding to the complete fuel amount. When maintaining some comparable conditions (oil and water temperature etc.) the method is available for diagnosing the engine points which are not influenced by dynamics of their own start (viz. injection system, piston group etc.), and for obtaining information about the overall condition of the engine tested. The method is the more usable, the more it is possible to neglect the influence of shift forces of the crankshaft system relative to the masses of rotation, said influence bineg practically constant for all the diagnostic measurements carried out on a particular engine type.

The claimed apparatus is switched on responsive to an external control signal 39 on the start of the tested engine with full fuel amount, viz. at full torque, after the predetermined revolutions approaching the nominal ones have been attained; the diagnostic values ascertained at this instant are simultaneously stored into memory circuits of the evaluating unit 4 of the apparatus. These values released in the form of diagnostic indices are indicated on a pointer gauge in the corresponding blocks of the indication unit 5.

The apparatus according to the present invention enables in this way the technical condition of an internal combustion machine as a whole as well as its basic operation points to be completely tested and evaluated.

The apparatus is versatile and can be applied to all types of internal combustion and spark-ignition engines operating upon the principle of ignition of cylinder charge with injected fuel, which means engines for stationary appliances, automotive, ship or railroad transports, tractors and engines for earthwork machines.

Principal terms of FIG. 1b

A = beginning of fuel supply by the fuel pump
B = beginning of by-passing (i.e., fuel supply end) by the fuel pump
C = top dead center (TDC) of the piston of the respective cylinder
$\alpha_p$ = fuel supply advance before the TDC
$\alpha_\beta$ = fuel supply interval (AB)
$\Psi_n$ = envelope of the ultrasonic signal.

What is claimed is:

1. An arrangement for complex diagnostic testing of internal combustion engines comprising a control unit, a measuring unit, an operating unit, an evaluation unit and an indication unit, a pick-up device for sensing the position of the engine crankshaft, pick-up devices for sensing pressures, vibrations, emitted ultrasonic signals and temperatures, the input of the control unit being connected to the pick-up device for sensing the position of the engine crankshaft, input terminals of the measuring unit being connected to the pick-up devices for sensing pressures, vibrations, emitted ultrasonic signals and temperatures, input terminals of the operating unit being connected to output terminals of the control unit and output terminals of the measuring unit, and output terminals of the operating unit being connected to input terminals of the measuring unit, input terminals of the evaluation unit and input terminals of the indication unit.

2. Arrangement as claimed in claim 1 where the control unit comprises a synchronization block with a shaping circuit of synchronizing signals and a pulse generator and a control block with a generator of control pulses and with a locking circuit.

3. Arrangement as claimed in claim 1, where the measuring unit comprises a block for determination of the instantaneous angular speed of the engine crankshaft, a block for working pressure signals with an amplifying circuit, a shaping circuit and a pulse generator, a block for working emitted ultrasonic signals with an amplifier, a shaping circuit and a pulse generator, a block for working of vibration signals with an amplifier circuit, a shaping circuit and a pulse generator and a block for working of signals from the temperature pick-up device.

4. Arrangement as claimed in claim 1 where the evaluation unit comprises a block for storage of instantaneous magnitudes of measured values, a block for performing derivations of the course of supplied values and their storage with a derivation circuit and a memory circuit, a block for determination of distances of characteristic pulses indicated in angular displacements of the engine crankshaft with an integration circuit and a memory circuit, a block for performing integrals of supplied values with an integration circuit and a memory circuit and a block for determination and storage of maximum magnitudes of supplied values with a circuit for determination of maximum magnitudes and with a memory circuit.

5. Arrangement as claimed in claim 1 where the indication unit comprises a block for indication of diagnostic indices, a block for indication of the course of input signals, and a block for indication of generated pulses.

6. Arrangement as claimed in claim 1 where the block for determination of the instantaneous angular speed of the engine crankshaft comprises a voltage controlled oscillator, a counter, a phase detector, and feedback circuits interconnected as a phase synchronization loop.

7. An apparatus as claimed in claim 1, wherein the selected diagnostic signals are picked up at a particular instant and released in the form of diagnostic indices processed in accordance with predetermined algorithms and in a combination predetermined for individual engine types.

8. An apparatus as claimed in claim 1, wherein the amount of fuel injected into the cylinder is indicated on the basis of the course of pressure in the injection line from the numerical value of integral of square root of the pressure signal course in a dependence on time.

9. An apparatus as claimed in claim 1, wherein the time of fuel supply into the cylinder is indicated on the basis of the course of ultrasonic signals released by the injection pump.

10. An apparatus as claimed in claim 1, wherein the start of the fuel supply by the injection pump is indicated on the basis of the course of ultrasonic signals released by the injection pump.

11. An apparatus as claimed in claim 1, wherein the throughflow conditions in the injection nozzle are indicated on the basis of the injection pressure course, preferably, from the ratio between two selected points of the pressure curve.

12. An apparatus as claimed in claim 1, wherein the effective output of the individual cylinders is indicated on the basis of the difference between areas below the course of both combustion and compression pressures in the cylinder.

13. An apparatus as claimed in claim 1, wherein the mechanical condition of the injection pump is indicated on the basis of the data corresponding to the integral of curve of the ultrasonic signal released by the injection pump.

14. The arrangement according to claim 1, wherein said internal combustion engine utilizes fuel injection and includes an injection pump, further comprising:
an ultrasonic or pressure transducer coupled to the delivery branch of said injection pump for providing an ultrasonic pressure signal corresponding to the cycle of operation of said pump;
analog signal processing means coupled to said transducer for providing a signal indicative of the time interval during which said pump supplies fuel in each cycle of operation thereof;
analog integrating means for providing an injection pump performance signal corresponding to the integral of the signal provided by said ultrasonic or pressure transducer, over said fuel supply time interval; and
means coupled to said integrating means for displaying said injection pump performance signal.

* * * * *

UNITED STATES PATENT OFFICE
CERTIFICATE OF CORRECTION

Patent No. 4,252,013    Dated February 24, 1981

Inventor(s)   Blanka Hyanova, et al

It is certified that error appears in the above-identified patent and that said Letters Patent are hereby corrected as shown below:

Column 3, line 22: "dependenc" should be --dependence--.

Column 4, line 3: "hithereto" should be --hitherto--.

Column 5, line 45: "circuit" should be --circuits--.

Column 6, line 14: Cancel "by" first occurrence.

line 16: "by" should be --is--.

Column 11, line 28: "HU" should be --TDC--.

lines 58 and 63: "$\varepsilon$" should be --$\nu$--.

Column 13, line 14: "$\alpha_\beta$" should be --$\alpha_\alpha$--.

Signed and Sealed this

First Day of September 1981

[SEAL]

Attest:

GERALD J. MOSSINGHOFF

Attesting Officer    Commissioner of Patents and Trademarks